US012799886B2

(12) United States Patent
Nagase et al.

(10) Patent No.: US 12,799,886 B2
(45) Date of Patent: Nov. 17, 2026

(54) EXHAUST PIPE

(71) Applicant: ISUZU MOTORS LIMITED, Tokyo (JP)

(72) Inventors: Tomohiro Nagase, Fujisawa (JP); Kazushi Funayama, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 242 days.

(21) Appl. No.: 18/693,455

(22) PCT Filed: Sep. 1, 2022

(86) PCT No.: PCT/JP2022/032985

§ 371 (c)(1),
(2) Date: Mar. 19, 2024

(87) PCT Pub. No.: WO2023/047913

PCT Pub. Date: Mar. 30, 2023

(65) Prior Publication Data

US 2024/0392717 A1 Nov. 28, 2024

(30) Foreign Application Priority Data

Sep. 24, 2021 (JP) ................................ 2021-155276

(51) Int. Cl.
*F01N 13/08* (2010.01)
*F01N 3/029* (2006.01)
(Continued)

(52) U.S. Cl.
CPC ............. *F01N 13/08* (2013.01); *F01N 3/206* (2013.01); *F01P 11/04* (2013.01); *F01N 3/029* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 6,513,323 B1 * | 2/2003 | Weigl | B01D 53/9431 137/340 |
| 2009/0158717 A1 * | 6/2009 | Kimura | F01N 13/08 60/299 |

(Continued)

FOREIGN PATENT DOCUMENTS

| | | | | |
|---|---|---|---|---|
| DE | 102008041486 A1 * | 2/2010 | F01N 13/08 |
| EP | 2405109 A2 * | 1/2012 | B01F 25/314 |

(Continued)

OTHER PUBLICATIONS

Patent Cooperation Treaty, International Search Report, Application No. PCT/JP2022/032985, dated Oct. 11, 2022, in 5 pages.

(Continued)

*Primary Examiner* — Binh Q Tran
(74) *Attorney, Agent, or Firm* — PROCOPIO, CORY, HARGREAVES & SAVITCH LLP

(57) ABSTRACT

An exhaust pipe has a bifurcated shape in which a pipe portion and an attachment portion are integrated. The attachment portion has a leading end portion protruding into the pipe portion at an intermediate position of the pipe portion, and a terminal end portion protruding to an outside of the pipe portion. The attachment portion includes a recess being recessed from a leading end toward the terminal end portion and whose bottom is disposed with a leading end of an injection valve inserted into an attachment hole of the attachment portion. An injection axis of the injection valve intersects with a pipe axis of the pipe portion at an acute angle. A liquid is injected in a conical shape increasing in diameter along the injection axis from the injection valve.
(Continued)

The recess has a truncated cone shape having an apex angle greater than the conical shape of the liquid injected.

3 Claims, 3 Drawing Sheets

(51) Int. Cl.
*F01N 3/20* (2006.01)
*F01P 11/04* (2006.01)

(52) U.S. Cl.
CPC .......... *F01N 3/208* (2013.01); *F01N 2610/02* (2013.01); *F01N 2610/11* (2013.01); *F01N 2610/14* (2013.01); *F01N 2610/1486* (2013.01); *F02M 2200/8023* (2013.01); *F02M 2200/85* (2013.01); *F02M 2200/855* (2013.01)

(56) References Cited

U.S. PATENT DOCUMENTS

2010/0107614 A1* 5/2010 Levin .................. B01F 25/4314 60/303
2013/0081380 A1 4/2013 Kawashima et al.
2013/0180232 A1* 7/2013 Shinoda .................... F01N 3/10 60/300
2014/0260202 A1* 9/2014 Bays .......................... F01N 3/18 60/274
2016/0061083 A1* 3/2016 Pramas ................... F01N 3/208 60/301
2016/0312679 A1* 10/2016 Schellin ................ F01N 3/2066

FOREIGN PATENT DOCUMENTS

JP 2008-138594 A 6/2008
JP 4248199 B2 4/2009
JP 2009-115057 A 5/2009
JP 2011-202512 A 10/2011
JP 2011-256851 A 12/2011

OTHER PUBLICATIONS

Patent Cooperation Treaty, WOSA, Application No. PCT/JP2022/032985, dated Oct. 11, 2022, in 4 pages.
Chinese Patent Office, Office Action, Application No. 202280064507.6 on Jun. 30, 2026, in 11 pages.

* cited by examiner

EXHAUST PIPE

CROSS-REFERENCE TO RELATED APPLICATIONS

This application is US National Stage of International Patent Application PCT/JP2022/032985, filed Sep. 1, 2022, which claims benefit of priority from Japanese Patent Application JP2021-155276, filed Sep. 24, 2021, the contents of both of which are incorporated herein by reference.

TECHNICAL FIELD

The present disclosure relates to an exhaust pipe, and more specifically, to an exhaust pipe including an attachment portion to which an injection valve is attached.

BACKGROUND ART

There has been proposed an exhaust pipe including an attachment portion for attaching a fuel injection valve for directly injecting fuel into the exhaust pipe (for example, see Patent Literature 1).

CITATION LIST

Patent Literature

Patent Literature 1: JP2011-256851A

SUMMARY OF INVENTION

Technical Problem

When a liquid such as fuel is directly injected into the exhaust pipe from the injection valve, it is desirable to inject the liquid along a flow of exhaust gas, and it is desirable that a pipe axis of the exhaust pipe and an injection axis of the injection valve are parallel to each other. However, it is structurally difficult to make the injection axis of the injection valve parallel to the pipe axis of the exhaust pipe. Further, since the liquid injected from the injection valve spreads in a conical shape that increases in diameter along the injection axis, the liquid easily adheres to a wall surface of the exhaust pipe.

When an angle formed by the injection axis of the fuel injection valve and the pipe axis of the exhaust pipe becomes great as in the exhaust pipe described in Patent Literature 1, there is a problem that the liquid injected from the injection valve and atomized adheres to the wall surface of the exhaust pipe and is liquefied on the wall surface. When the liquid is liquefied on the wall surface of the exhaust pipe, the liquefied liquid may adhere to an exhaust post-treatment device disposed on a downstream side.

An object of the present disclosure is to provide an exhaust pipe that prevents a liquid directly injected into the exhaust pipe from adhering to a wall surface of the exhaust pipe.

Solution to Problem

According to an aspect of the present disclosure, there is provided an exhaust pipe having a bifurcated shape in which a pipe portion having a tubular shape and an attachment portion having a columnar shape are integrated, the attachment portion having a leading end portion protruding into the pipe portion at an intermediate position of the pipe portion and a terminal end portion protruding to an outside of the pipe portion,

- the attachment portion including an attachment hole into which an injection valve is inserted from a terminal end toward the leading end portion, and a recess that is recessed from a leading end toward the terminal end portion and whose bottom is disposed with a leading end of the injection valve,
- an injection axis of the injection valve intersecting with a pipe axis of the pipe portion at an acute angle, and a liquid being injected in a conical shape increasing in diameter along the injection axis from the injection valve,
- in which the recess has a truncated cone shape having an apex angle greater than the conical shape of the liquid, and
- an outer end on an outermost side of the recess and an outer end of an inner wall surface of the pipe portion continuous from the recess are linear.

Advantageous Effects of Invention

According to the aspect of the present disclosure, since the wall surface of the recess and the inner wall surface of the pipe portion are aligned straight, the angle formed by the injection axis of the injection valve and the pipe axis of the pipe portion can be minimized in a state in which the liquid injected from the injection valve and spreading in a conical shape does not adhere to both the wall surface of the recess and the inner wall surface of the pipe portion. Accordingly, the liquid injected from the injection valve and spreading in the conical shape can be caused to follow a flow of exhaust gas, and the liquid can be prevented from adhering to the inner wall surface of the pipe portion facing the injection valve. As a result, liquefaction of the injected liquid can be prevented.

DESCRIPTION OF EMBODIMENTS

Figure 1:
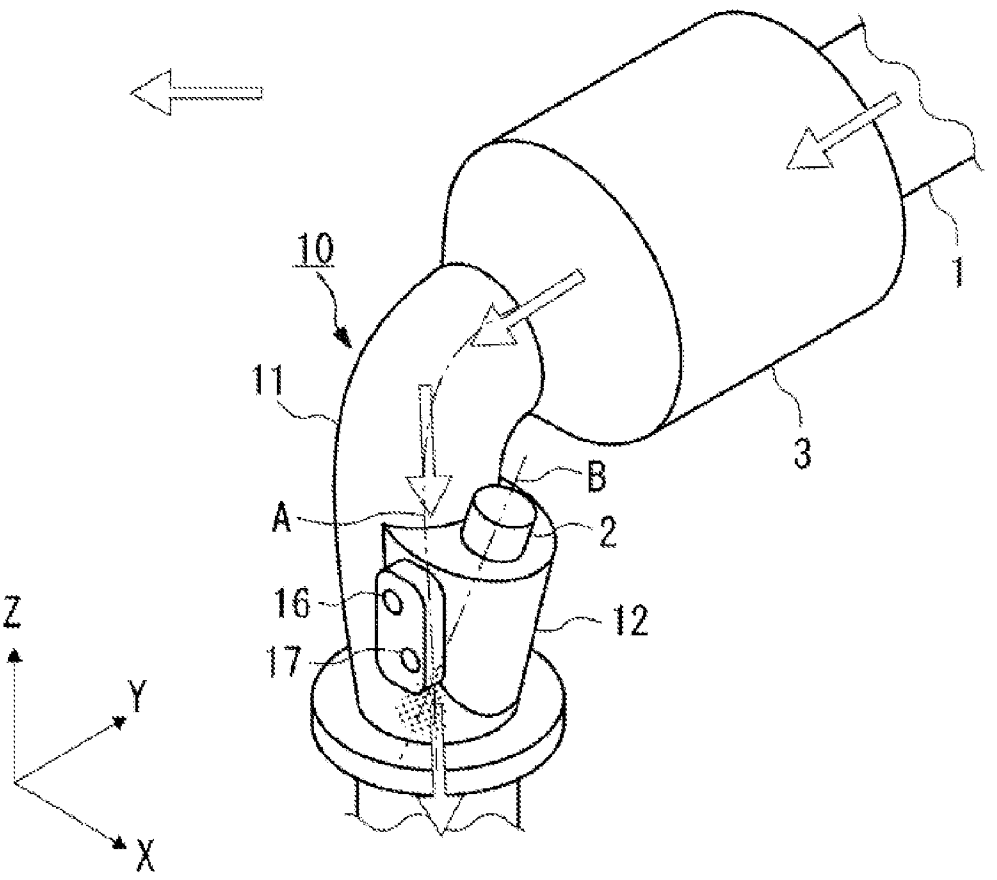
FIG. 1 is a perspective view illustrating an exhaust pipe according to an embodiment.

Hereinafter, an embodiment of an exhaust pipe according to the present disclosure will be described. In the drawing, a Z direction indicates a vertical direction, and each of an X direction and a Y direction indicates a direction orthogonal to the Z direction on a plane orthogonal to the Z direction. A one-dot chain line indicates a pipe axis A of a pipe portion 11, and a two-dot chain line indicates an injection axis B of an injection valve 2. In the present disclosure, the pipe axis A may be bent in accordance with bending of the pipe portion 11, and is not limited to a straight line, and the injection axis B is a straight line. White arrows in the drawing indicate a flow of exhaust gas. In the drawing, dimensions of the members are changed for easy understanding of the configuration, and are not always matched with those actually manufactured. Hereinafter, an upstream end indicates one end on an upstream side in relation to the flow of exhaust gas among both ends of the pipe portion 11, and a downstream end indicates the other end on a downstream side in relation to the flow of exhaust gas. In addition, a leading end indicates one end of both ends of an attachment portion 12 and the injection valve 2, which is located on an inner side of the exhaust pipe 10, and a terminal end indicates the other end located on an outer side of the exhaust pipe 10.

As illustrated in FIG. 1, the exhaust pipe 10 according to the embodiment constitutes a part of an exhaust passage 1 through which exhaust gas discharged from an engine flows, and is disposed between the engine (not illustrated) and an oxidation catalyst device (not illustrated). Regarding the flow of the exhaust gas, the engine is disposed on an upstream side of the exhaust pipe 10, and the oxidation catalyst device is disposed on a downstream side of the exhaust pipe 10 to oxidize unburned fuel. The exhaust pipe 10 has a bifurcated shape in which the pipe portion 11 and the attachment portion 12 are integrated, and the injection valve 2 that injects fuel to the exhaust gas is attached to the attachment portion 12. The injection valve 2 injects fuel in a conical shape in which the injection axis B intersects the pipe axis A of the pipe portion 11 at an acute angle and a diameter increases along the injection axis B. In the present disclosure, the injection axis B and the pipe axis A intersecting at an acute angle means that an angle formed by the injection axis B and the pipe axis A is not a right angle.

The injection valve 2 injects fuel along the injection axis B from an injection port (not illustrated) formed at a leading end thereof. For the purpose of atomization, the fuel injected from the injection valve 2 spreads in a conical shape in which a diameter increases in a direction away from the injection axis B. The expansion of the conical shape of the injected fuel, that is, an apex angle of the conical shape can be appropriately changed according to the specification of the injection valve 2.

In the present disclosure, the term "integrated" refers to a state in which the pipe portion 11 and the attachment portion 12 are not combined as separate bodies but are integrally molded. As a method of manufacturing the exhaust pipe 10 in which the pipe portion 11 and the attachment portion 12 are integrated, lost-wax casting is exemplified. The bifurcated shape indicates a state in which the attachment portion 12 is disposed at an intermediate position of the pipe portion 11 and the attachment portion 12 is branched in a Y shape from the pipe portion 11.

Figure 2:
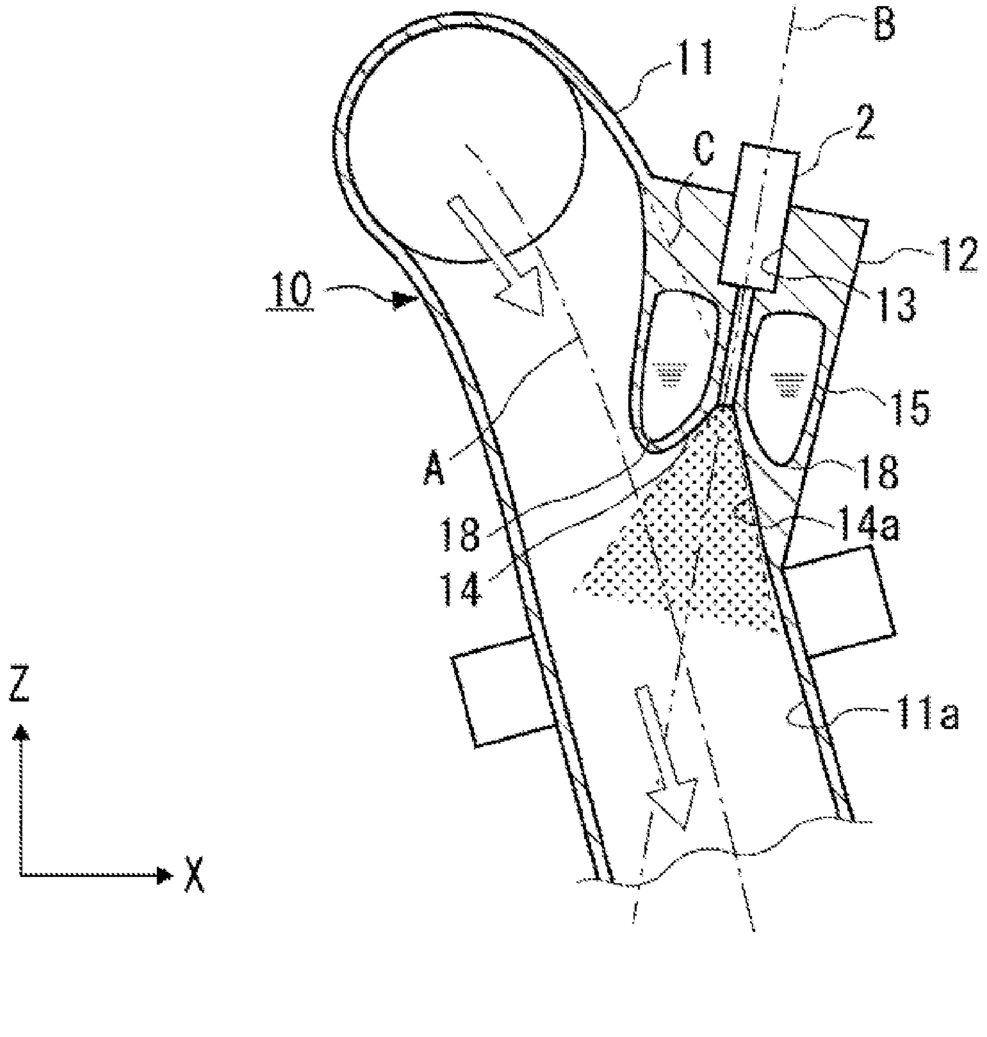
FIG. 2 is a longitudinal sectional view of the exhaust pipe of FIG. 1.

As illustrated in FIG. 2, the upstream end of the pipe portion 11 is connected to a downstream end of a selective reduction catalyst device 3, and the downstream end thereof communicates with the oxidation catalyst device (not illustrated). The pipe portion 11 has a predetermined flow area and has a circular tube shape in which both ends of the upstream end and the downstream end are opened.

Figure 3:
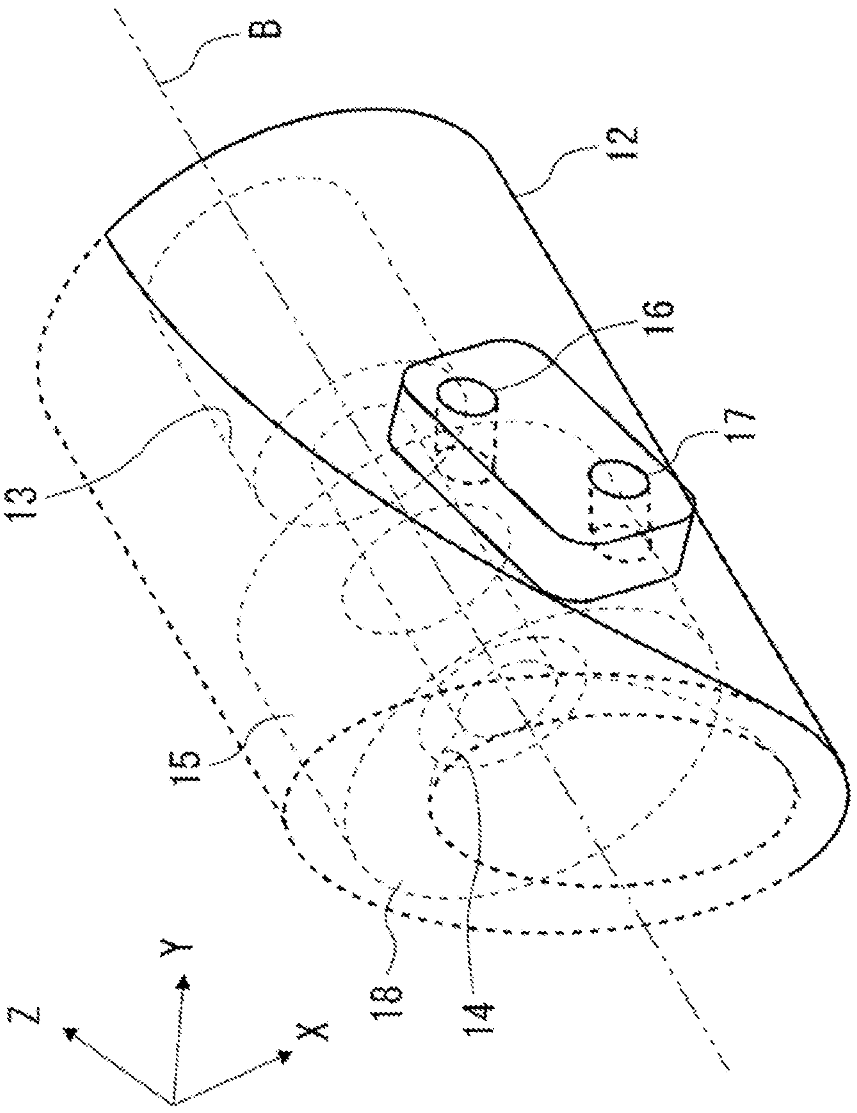
FIG. 3 is a perspective view illustrating only an attachment portion of FIG. 1.

As illustrated in FIG. 3, a leading end of the attachment portion 12 protrudes into the pipe portion 11 at the intermediate position of the pipe portion 11, and a terminal end thereof protrudes to the outside of the pipe portion 11. The attachment portion 12 has a cylindrical shape whose axial direction is directed to the injection axis B of the injection valve 2, and the leading end thereof is inclined with respect to the injection axis B while the terminal end thereof is perpendicular to the injection axis B. The shape of the attachment portion 12 is not limited to the cylindrical shape, and may be a polygonal columnar shape. The attachment portion 12 includes an attachment hole 13, a recess 14, a cooling passage 15, an inlet 16, and an outlet 17.

The attachment hole 13 is a hole extending from the terminal end of the attachment portion 12 to the bottom of the recess 4 formed at a leading end portion thereof, and has the same shape as an outer peripheral shape of the injection valve 2. In the injection valve 2 according to the present embodiment, a leading end portion and a terminal end portion have different diameters, the leading end portion has a shape thinner than the terminal end portion, and similarly, the attachment hole 13 has a shape in which a hole diameter on a leading end side is smaller than a hole diameter on a terminal end side. The shape of the attachment hole 13 is not limited to the shape of the embodiment, and can be appropriately changed according to the outer peripheral shape of the injection valve 2.

The recess 14 is recessed from the leading end of the attachment portion 12 toward a leading end of the attachment hole 13 at the terminal end portion, and the leading end of the injection valve 2 is disposed at the bottom of the recess 14. The recess 14 has a truncated cone shape whose diameter decreases along the injection axis B. In the present disclosure, the truncated cone shape is a shape obtained by cutting a conical shape having an apex positioned on the terminal end side with the injection axis B as a rotation axis, with the leading end of the attachment portion 12 as a lower bottom surface, and with the leading end of the injection valve 2 as an upper bottom surface. The apex angle of the truncated cone shape of the recess 14 is greater than the apex angle of the conical shape of a liquid injected from the injection valve 2. The greater the apex angle of the truncated cone shape of the recess 14 is with respect to the apex angle of the conical shape of the liquid, the more easily the exhaust gas flows into the recess 14. The apex angle of the truncated cone shape of the recess 14 is greater than the apex angle of the conical shape of the injected liquid, but is preferably close to the apex angle of the conical shape of the liquid, and more preferably less than 5 degrees.

The cooling passage 15 is formed inside the leading end side of the attachment portion 12 and annularly surrounds the leading end portion of the injection valve 2. The cooling passage 15 communicates with the inlet 16 and the outlet 17 formed on an outer periphery of the attachment portion 12, and is partitioned so that a refrigerant flowing in from the inlet 16 flows out from the outlet 17. Examples of the refrigerant flowing through the cooling passage 15 include cooling water and lubricating oil of the engine (not illustrated). The cooling passage 15 may have a structure in which one end in an annular circumferential direction communicates with the inlet 16 and the other end communicates with the outlet 17 instead of the partition.

As illustrated in FIG. 2, an outer end 14*a* on the outermost side of the recess 14 and an outer end 11*a* of an inner wall surface of the pipe portion 11 continuous with the recess 14 are linear. The outer end 14*a* indicates a portion positioned on the outermost side on a wall surface of the recess 14, and indicates a portion positioned on the outermost side of a generatrix of the truncated cone shape of the recess 14. The outer end 11*a* indicates a portion of the inner wall surface continuous with the recess 14, which is the most distant from the pipe axis A. The term "continuous" refers to a state in which the wall surface of the recess 14 and the inner wall surface of the pipe portion 11 continue to each other without being interrupted. In the present disclosure, the description of "linear" includes a state in which the outer end 14*a* and the outer end 11*a* are on the same straight line, and includes a state in which an angle formed by the outer end 14*a* and the outer end 11*a* is less than 10 degrees. However, a state in which the outer end 11*a* is positioned inside the exhaust pipe 10 with respect to the outer end 14*a* is excluded.

A bottom portion 18 on the leading end side of the cooling passage 15 is disposed on the bottom of the recess 14, that is, on the leading end side of the attachment portion 12 with respect to the leading end of the injection valve 2. The leading end side of the cooling passage 15 annularly surrounds a periphery of the recess 14. In a cross-sectional view taken along a plane passing through the injection axis B, the leading end side of the cooling passage 15 has a shape narrowed from the terminal end side toward the leading end side as one surface of the passage extends along the recess 14.

At least a part of the cooling passage 15 is formed in a portion of the leading end portion of the attachment portion 12 protruding into the pipe portion 11. In the present disclosure, the portion protruding into the pipe portion 11 is a portion existing on an inner side of a virtual inner wall surface C, on which the inner wall surface of the pipe portion 11 is present, in a portion in which the pipe portion 11 and the attachment portion 12 are integrated.

An outer peripheral surface of the portion of the leading end portion of the attachment portion 12 protruding into the pipe portion 11 has a streamline shape. The outer peripheral surface of the protruding portion is constituted by a part of a cylindrical surface because the attachment portion 12 has the cylindrical shape.

The fuel injected from the injection valve 2 inserted into the attachment hole 13 of the attachment portion 12 of the exhaust pipe 10 in the direction from the upstream side to the downstream side in relation to the flow of the exhaust gas spreads in a conical shape having an increased diameter along the injection axis B. The fuel spread in the conical shape is mixed with the exhaust gas without contacting the recess 14 or the inner wall surface of the pipe portion 11, and reaches the oxidation catalyst device disposed downstream.

As described above, the exhaust pipe 10 according to the present disclosure has a configuration in which the pipe portion 11 through which the exhaust gas flows and the attachment portion 12 to which the injection valve 2 is attached are integrally molded, and the cooling passage 15 is formed in the attachment portion 12. Accordingly, the number of components can be reduced and the weight can be further reduced by reducing the number of fasteners for fastening the separate bodies to each other, as compared with a case where the separate bodies are combined.

Since the attachment portion 12 of the exhaust pipe 10 has the cooling passage 15, the leading end portion of the injection valve 2 can be cooled. This can prevent the injection port formed at the leading end of the injection valve 2 from being clogged by carbonization of the fuel due to heat of the exhaust gas.

The exhaust pipe 10 has a structure in which the wall surface of the recess 14 and the inner wall surface of the pipe portion 11 continuous with the recess 14 are aligned straight. Therefore, the angle formed by the injection axis B of the injection valve 2 and the pipe axis A of the pipe portion 11 can be minimized without the fuel injected from the injection valve 2 and spreading in a conical shape adhering to both the wall surface of the recess 14 and the inner wall surface of the pipe portion 11.

Accordingly, the liquid injected from the injection valve 2 and spreading in the conical shape can be made to follow the flow of the exhaust gas as much as possible, and the liquid can be prevented from adhering to the inner wall surface of the pipe portion 11 facing the injection valve 2. As a result, it is advantageous to prevent liquefaction of the injected liquid, and it is possible to avoid a situation in which a failure occurs in post-treatment of the exhaust gas of an exhaust post-treatment device such as the oxidation catalyst device disposed on a downstream side.

By making the angle between the injection axis B and the pipe axis A the smallest, it is possible to prevent the exhaust gas from flowing around into the recess 14. This is advantageous in reducing a thermal influence on the injection valve 2, and clogging of the injection port of the injection valve 2 due to carbonization can be prevented.

The exhaust pipe 10 is configured such that the bottom portion 18 on the leading end side of the cooling passage 15 is disposed closer to the leading end side of the attachment portion 12 than the bottom of the recess 14. That is, the bottom portion 18 is disposed closer to the leading end side than the leading end of the injection valve 2, and the leading end of the injection valve 2 is disposed at an intermediate position of the cooling passage 15 in an injection axis direction. Therefore, it is advantageous to protect the injection valve 2 from heat damage of the exhaust gas by the refrigerant flowing through the cooling passage 15. Accordingly, clogging of the injection port of the injection valve 2 due to carbonization can be more effectively prevented.

In the exhaust pipe 10, a part of the cooling passage 15 is formed in a portion of the leading end portion of the attachment portion 12 protruding into the pipe portion 11. Since the portion of the attachment portion 12 protruding into the pipe portion 11 is a portion that collides with the exhaust gas, a temperature of the exhaust gas more easily rises. Forming the cooling passage 15 in this portion is advantageous in protecting the injection valve 2 from heat damage caused by the exhaust gas.

In the exhaust pipe 10, the outer peripheral surface of the portion of the leading end portion of the attachment portion 12 protruding into the pipe portion 11 has the streamline shape. This is advantageous in preventing an increase in exhaust resistance caused by the protruding portion.

Although the embodiment according to the present disclosure has been described above, the exhaust pipe 10 according to the present disclosure is not limited to the specific embodiment, and various modifications and changes are possible within the scope of the gist of the present disclosure.

The injection valve 2 attached to the attachment portion 12 of the exhaust pipe 10 is not limited to the one that supplies fuel to the exhaust gas flowing through the exhaust passage 14, and is also applicable to one that supplies a reducing agent such as urea water to the exhaust gas.

An arrangement position of the exhaust pipe 10 is not limited to the downstream side of the selective reduction catalyst device 3, and may be the upstream side of a device using the liquid injected from the injection valve 2 in relation to the flow of the exhaust gas. For example, when urea water is injected from the injection valve 2, the exhaust pipe 10 may be disposed on the upstream side of the selective reduction catalyst device 3. For example, when the fuel is injected from the injection valve 2, the exhaust pipe 10 may be disposed on an upstream side of an NOx occlusion type reduction catalyst device.

The present application is based on Japan Patent Application (Patent Application No. 2021-155276) filed on Sep. 24, 2021, and the contents thereof are incorporated herein by reference.

INDUSTRIAL APPLICABILITY

The exhaust pipe according to the present disclosure can be widely applied to a technique for preventing a liquid directly injected into the exhaust pipe from adhering to a wall surface of the exhaust pipe.

REFERENCE SIGNS LIST

1 exhaust passage
2 injection valve
10 exhaust pipe
11 pipe portion
11*a* outer end of inner wall surface of pipe portion
12 attachment portion
13 attachment hole
14 recess
14*a* outer end of recess
15 cooling passage

The invention claimed is:

1. An exhaust pipe having a bifurcated shape in which a pipe portion having a tubular shape and an attachment portion having a columnar shape are integrated, the attachment portion having a leading end portion protruding into the pipe portion at an intermediate position of the pipe portion and a terminal end portion protruding to an outside of the pipe portion, the attachment portion including an attachment hole into which an injection valve is inserted from a terminal end toward the leading end portion, and a recess that is recessed from a leading end toward the terminal end portion and whose bottom is disposed with a leading end of the injection valve, an injection axis of the injection valve intersecting with a pipe axis of the pipe portion at an acute angle, and a liquid being injected in a conical shape increasing in diameter along the injection axis from the injection valve, wherein the recess has a truncated cone shape having an apex angle greater than the conical shape of the liquid, an outer end on an outermost side of the recess and an outer end of an inner wall surface of the pipe portion continuous from the recess are linear, a cooling passage is formed inside the attachment portion, the cooling passage annularly surrounding a leading end portion of the injection valve, and a bottom portion on a leading end side of the cooling passage is disposed closer to a leading end side of the attachment portion than the bottom of the recess.

2. The exhaust pipe according to claim 1, wherein at least a part of the cooling passage is formed in a portion of the leading end portion of the attachment portion protruding into the pipe portion.

3. The exhaust pipe according to claim 1, wherein an outer peripheral surface of a portion of the leading end portion of the attachment portion protruding into the pipe portion has a streamline shape.

* * * * *